United States Patent Office 2,808,334
Patented Oct. 1, 1957

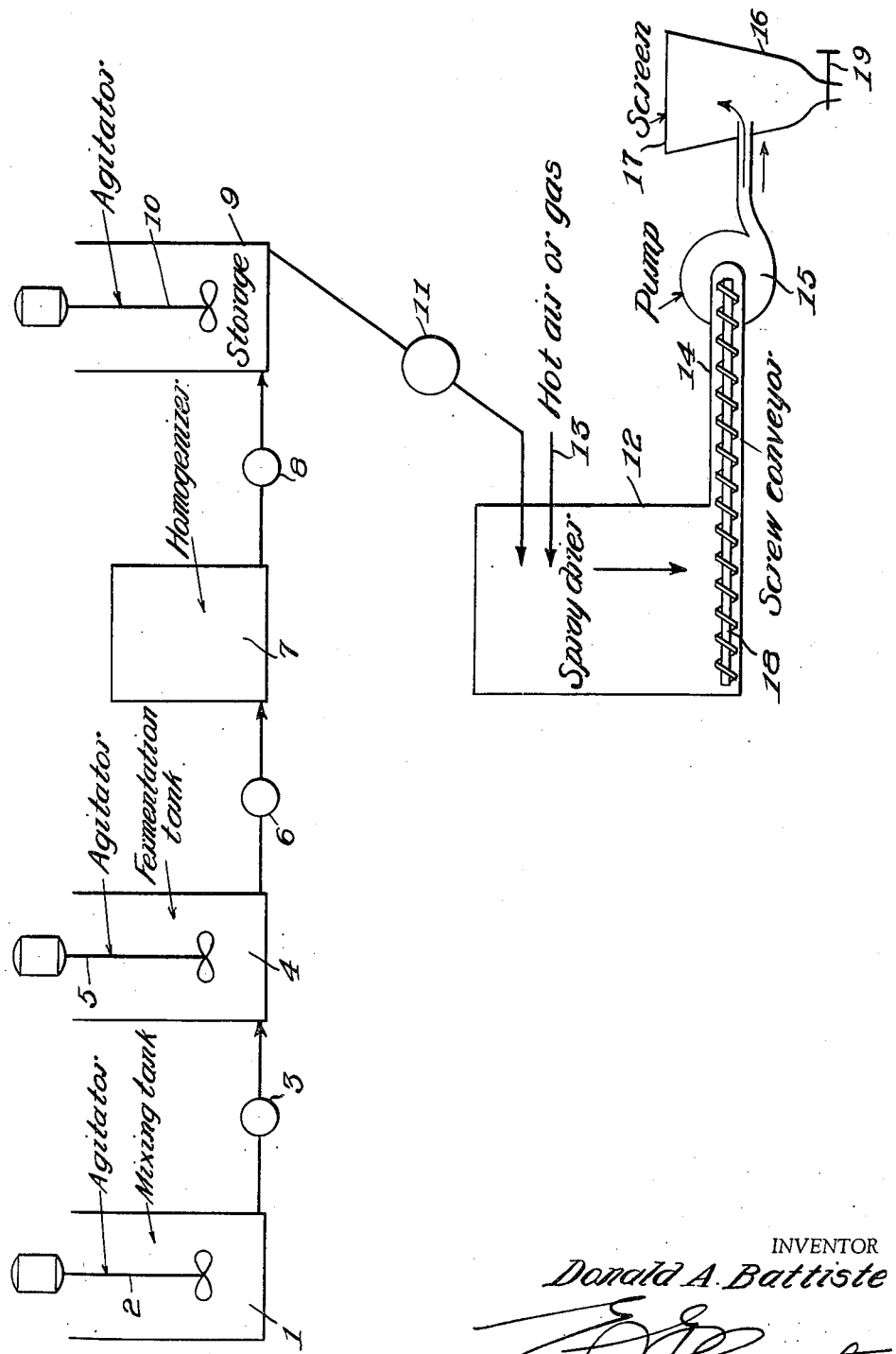

2,808,334

PROCESS FOR THE PRODUCTION OF A DEHYDRATED BREAD SPONGE PRODUCT

Donald A. Battiste, Philadelphia, Pa.

Application March 23, 1953, Serial No. 344,167

8 Claims. (Cl. 99—94)

The present invention relates to a bread sponge product and a process for the production thereof.

In my co-pending applications Serial No. 113,227, filed August 30, 1949, now Patent Number 2,632,707, granted March 24, 1953, and Serial No. 305,162 filed August 19, 1952, there is disclosed processes for the production of a dehydrated bread sponge which may be produced by forming a sponge from a suitable mixture of flour, water, yeast etc., and thereafter finely dividing the sponge and drying the finely divided sponge under carefully controlled temperature conditions.

The two forms of dried sponge in the aforementioned applications are novel products which retain the general characteristics of a bread sponge in a dough product capable of being stored for long periods of time. In utilizing the sponge of the prior applications some difficulty has arisen due to the lack of fineness of the sponge product. As pointed out in particular in application Serial No. 305,162 filed August 19, 1952, the active particles in the sponge produced in accordance with the processes of this last mentioned application are apparently close to the formed crust. If, therefore, the dehydrated sponge is passed through a fine sieve the crust and active yeast cells may be largely separated therefrom. It may be further noted that in any event the pellets formed in accordance with these prior processes must be very carefully ground since subjection of the pellets or flour to temperatures above 140° F. during grinding inactivates the flour.

In accordance with the present invention, therefore, the surprising discovery has been made that an active sponge may be produced from conventional bread forming ingredients by fermentation in a liquid state.

It has further been discovered in accordance with the present invention that a liquid fermented sponge may be homogenized and thereafter spray dried to substantially instantaneously form an active flour fine dehydrated sponge product.

The single figure of the drawing is a diagrammatic illustration of the process of the present invention.

In practicing the process of the present invention a typical bread mixture may be formed which will contain for each 100 lbs. of flour from 4 to 8 lbs. of fat of any conventional edible type such as vegetable shortening or lard. In addition the mixture may contain from 3 to 6 lbs. of yeast, from 4 ozs. to 1 lb. of malt, suitable yeast food usually a mineral salt, of from 3 ozs. to 1 lb., and in some instances from ¼ to 1 lb. of edible lactic acid. The lactic acid serves to enhance the fermentation of the sponge and produce a more vigorous sponge. It is also desirable to add some sugar to the mixture i. e. from 8 ozs. to 8 lbs. of sugar depending upon the type of bread required.

In order to produce a liquid dough slurry of relative low viscosity approximately 185 lbs. to 200 lbs. of water can be used. The amount of water will vary with the type of flour since certain flours require more water than others.

Thereafter the liquid dough slurry is subjected to temperatures of from 68° F. to 80° F. for a period of time varying from ten hours to one hour, i. e. the longer period being used for the lower temperatures. The fermented slurry is then thoroughly stirred and passed through a conventional homogenizer and thereafter pumped through a fine nozzle into a spray drier. At the same time the spray drier is fed with hot air or gas at a temperature of from 250° F. to 400° F. Preferably the liquid sponge is sprayed into the top of the drier and the hot air is also fed at the upper end thereof so that the hot air and the solidified sponge particles flow downwardly in concurrent relation through the drier. The outlet from the drier is preferably at the bottom thereof and both the solidfied sponge particles and air are subjected to suction so that there is a rapid discharge from the drier.

Preferably the amount of hot air fed to the drier is only sufficient at the temperature above set forth to rapidly and quickly solidify and dehydrate the sponge which is sprayed in the form of a fine mist and with this type of control it has been ascertained that the temperature of the particles immediately after drying is of the order of 120° F. to 140° F. so that there is no inactivation of the developed sponge.

The dehydrated sponge made in accordance with the above process is produced immediately upon spray drying in flour fine form and may be readily utilized for the production of a bread sponge after storage by the simple addition of sufficient water or milk to make a stiff dough. Preferably, the sponge upon drying has approximately 1% or less moisture content although a moisture content of up to 3% may be suitable. The reconstituted sponge may be utilized with a continuous dough mixing machine since the dough so produced will much more readily stand the punishment of a mixing machine than the ordinary type of dough.

If not too rich a bread is required the dehydrated sponge may be mixed with additional flour prior to the addition of water or milk and it will still produce a satisfactory loaf of bread.

Upon the reconstitution of the bread it is only necessary to allow the bread to rise for a short period of time as for example 10 to 15 minutes prior to putting the formed loaves into the oven for baking at conventional temperatures.

Referring to the figure of the drawing there is disclosed in outline form the process just described.

The various ingredients for the initial slurry are fed into a mixing tank 1 provided with a suitable agitator 2. Upon thorough mixing the ingredients may then be fed by means of the pump 3 into the fermentation tank 4 which is also provided with an agitator 5. After a suitable length of fermentation the still liquid slurry is pumped by means of pump 6 to the homogenizer 7 where it is homogenized at a pressure of from 500 to 2,000 lbs. per square inch. From the homogenizer 7 the liquid fermented sponge is fed by means of the pump 8 to the storage tank 9 which is also provided with an agitator 10. From the storage tank the fermented sponge is then fed by means of the pump 11 to the upper end of the spray drier 12. As indicated by the arrow 13 hot air or gas at a temperature of 250° F. to 400° F. is also fed into the upper end of the spray drier. The product is removed from the spray drier through the outlet 14 by means of the suction pump 15 which discharges into the funnel 16 provided with the screen 17 which permits the outlet of the excess air while preventing the outlet of dried sponge particles.

The funnel 16 is provided at its lower end with a suitable valve 19 to permit discharge of dried sponge particles from time to time. The lower end of the spray drier 12 may also be provided with a suitable screw conveyor 18 to facilitate discharge of powdered sponge material.

The following specific example serves to illustrate but is not intended to limit the present invention.

To 100 lbs. of flour was added 5 lbs. of fat, 5 lbs. of yeast, 8 ozs. of yeast food, 6 lbs. of sugar and 180 lbs. of water. The ingredient were mixed in a mixing tank and after thorough mixture fed to a fermentation tank and allowed to ferment at 75° F. for six hours. Thereafter the fermented liquid sponge was passed through a homogenizer at 1,000 lbs. per square inch pressure. The homogenized mixture was then fed in the form of a fine mist to the upper end of a spray drier where it was contacted with air at 300° F. The humidity of the air was relatively low equivalent to the humidity obtained by heating air at 70° F. and approximately 35% relative humidity to 300° F. The liquid sponge was almost instantaneously dried to a flour fineness and a moisture content of approximately 0.8%.

The flour fine product was formed into a dough after storage for several days by adding sufficient water to form a stiff dough thoroughly kneaded and allowed to set for 15 minutes in pans. It was thereafter baked to form an extremely fine textured bread.

What I claim is:

1. A process for the preparation of a dehydrated dough sponge which comprises preparing a dough mix including flour and yeast into a liquid of viscous consistency, fermenting said viscous mixture in liquid state to form a liquid dough sponge and thereafter spray drying said sponge to quickly and rapidly solidify and dehydrate same to form a flour fine product.

2. The process according to claim 1, wherein the liquid dough sponge is homogenized prior to spray drying.

3. A process for the preparation of a dehydrated dough sponge which comprises preparing a dough including flour and yeast in proportion of approximately from 3 to 6 parts of yeast for each 100 parts of flour, liquifying said dough into a viscous consistency by adding approximately 185 to 200 parts of water for each 100 parts of flour, fermenting said viscous dough in liquid state to form a liquid dough sponge, spray drying said liquid dough sponge by passing a fine spray thereof in concurrent relation to a current of hot inert gaseous medium having a temperature of between 250° F. to 400° F., the quantity of gaseous medium and the temperature thereof being so regulated that the temperature of the spray dried product immediately after drying is between 120° F. and 140° F.

4. The process of preparing a dehydrated dough sponge which comprises preparing a dough including flour and yeast, liquifying said dough by adding approximately 185 to 200 parts of water for each 100 parts of flour, fermenting said liquid dough to form a liquid dough sponge and thereafter spray drying said sponge to flour form.

5. The process, according to claim 4, wherein the matured dough is homogenized.

6. A process for the preparation of a dehydrated dough sponge which comprises forming a liquid dough from dough-making ingredients including flour, yeast and water, fermenting said dough to form a liquid dough sponge and thereafter spray drying said sponge to solidify and dehydrate same to flour form.

7. The process, according to claim 4, wherein the yeast and flour are in proportions of approximately 3 to 6 parts of yeast for each 100 parts of flour.

8. The process, according to claim 6 wherein the liquid dough is agitated during the fermentation thereof.

References Cited in the file of this patent

UNITED STATES PATENTS

| | | |
|---|---|---|
| 1,042,647 | Castle | Oct. 29, 1912 |
| 1,391,562 | Miller | Sept. 20, 1921 |
| 2,023,500 | Wogerbauer | Dec. 10, 1935 |
| 2,476,242 | Ginsburg | July 12, 1949 |
| 2,632,707 | Battiste | Mar. 24, 1953 |

FOREIGN PATENTS

| | | |
|---|---|---|
| 916 | Great Britain | of 1871 |

OTHER REFERENCES

Laster: The Bakers Digest, XXII, 6, 1948, page 114.